US008643203B2

(12) United States Patent
Huang

(10) Patent No.: US 8,643,203 B2
(45) Date of Patent: Feb. 4, 2014

(54) TWO-STROKE GASOLINE ENGINE EQUIPPED WITH A SELF-POWERING GENERATOR

(76) Inventor: Shao-Kuang Huang, New Taipei (TW)

( * ) Notice: Subject to any disclaimer, the term of this patent is extended or adjusted under 35 U.S.C. 154(b) by 301 days.

(21) Appl. No.: 13/277,543

(22) Filed: Oct. 20, 2011

(65) Prior Publication Data

US 2012/0098273 A1 Apr. 26, 2012

(30) Foreign Application Priority Data

Oct. 22, 2010 (TW) ................................ 99136153 A

(51) Int. Cl.
*F02B 63/04* (2006.01)
*H02K 7/18* (2006.01)

(52) U.S. Cl.
USPC .......................................................... 290/1 A

(58) Field of Classification Search
USPC ........................................ 290/1 A; 123/65 R
See application file for complete search history.

(56) References Cited

U.S. PATENT DOCUMENTS 4,357,916 A * 11/1982 Noguchi et al. ......... 123/51 BA

* cited by examiner

*Primary Examiner* — Javaid Nasri
(74) *Attorney, Agent, or Firm* — Ming Chow; Sinorica, LLC

(57) ABSTRACT

A two-stroke gasoline engine equipped with a self-powering generator is disclosed. The two-stroke gasoline engine includes a housing, an engine bearer, a crank and a self-powering generator. The housing is provided on a side of the two-stroke gasoline engine and formed with a central part. The engine bearer is fixed to the housing and formed on a side thereof with a receiving space for accommodating the self-powering generator. The crank is provided from the central part to pass through the engine bearer with one end protruding into the receiving space. The self-powering generator includes a stator and a rotor. The stator is fixed to the engine bearer, and the rotor is fixed to the crank through the central pivot part so that the self-powering generator is powered by the two-stroke gasoline engine and can generate power continuously.

8 Claims, 3 Drawing Sheets

TWO-STROKE GASOLINE ENGINE EQUIPPED WITH A SELF-POWERING GENERATOR

BACKGROUND OF THE INVENTION

1. Technical Field

The present invention relates to two-stroke gasoline engines, and more particularly, to a two-stroke gasoline engine equipped with a self-powering generator and is configured to be installed in a radio-controlled model device.

2. Description of Related Art

Currently, radio-controlled model devices are mainly driven by electrical motors or gasoline engines. In an engine-driven radio-controlled model device, apart from the engine acting as a driving source of the radio-controlled model device, one or more servo motors are required for controlling the functional parts of the radio-controlled model device, such as those components related to steering, acceleration, braking and so on. Therefore, in order to power such servo motors, an additional power supply device, such as a storage battery, a battery, an accumulator or the like, is usually provided in the radio-controlled model device. However, there is always a time limit of using depending on the surplus power in the power supply device. Once the storage battery or battery runs out of power, the radio-controlled model device will be out of control and may crash. In more serious cases, players may be even hurt by the uncontrolled radio-controlled model device. Thus, when operating a radio-controlled model device, a player has to keep an eye on the power level of the power supply device and immediately recharge or replace the power supply device (e.g. the storage battery or the battery) once the power supply device runs out of power. This, however, causes significant inconvenience to the player.

Furthermore, the replaced storage battery, battery or accumulator can pollute the environment if it is not recycled or properly disposed.

In view of the shortcomings of the prior art, it is desirable to have an engine equipped with a self-powering generator, and particularly, a two-stroke gasoline engine equipped with a self-powering generator.

SUMMARY OF THE INVENTION

The present invention provides a two-stroke gasoline engine equipped with a self-powering generator. The two-stroke gasoline engine is configured to be installed in a radio-controlled model device. The two-stroke gasoline engine has a housing, an engine bearer and a crank. The housing is provided on a side of the two-stroke gasoline engine and is formed with a central part. The engine bearer is fixed to the housing, and is formed on a side thereof with a receiving space for accommodating the self-powering generator. The receiving space is formed with a first segment and a second segment, and an inner diameter of the second segment is larger than an inner diameter of the first segment. The crank is provided from the central part to pass through the engine bearer with one end protruding into the receiving space. Therein, the self-powering generator has a stator and a rotor. The stator is fixed to the engine bearer. The rotor is provided with a central pivot part and a plurality of permanent magnets, wherein the rotor is fixed to the crank through the central pivot part, and an outer diameter of the rotor is smaller than the inner diameter of the first segment.

Hence, the primary objective of the present invention is to provide a two-stroke gasoline engine equipped with a self-powering generator, wherein the pivotal connection between the crank of the two-stroke gasoline engine and the self-powering generator allows the self-powering generator to be driven to generate a power for electronic parts of the model device as the two-stroke gasoline engine operates.

Another objective of the present invention is to provide a two-stroke gasoline engine equipped with a self-powering generator, wherein once the two-stroke gasoline engine is activated and sustained, the self-powering generator is driven to generate a power to drive the electronic parts of the model device to operate, so there is no need to use a power storage device such as a storage battery or battery.

Furthermore, the present invention also provides a two-stroke gasoline engine equipped with a self-powering generator. The two-stroke gasoline engine includes a housing, an engine bearer, a crank and the foregoing self-powering generator. The housing is provided on a side of the two-stroke gasoline engine 1 and formed with a central part and has least one first fastening hole. The engine bearer has at least one second fastening hole, corresponding to the first fastening hole, such that a fastener passes through the first and second fastening holes to fix the engine bearer to the housing. The crank is provided from the central part to pass through the engine bearer with one end protruding into a receiving space for accommodating the self-powering generator. The receiving space is formed with a first segment and a second segment, and an inner diameter of the second segment is larger than an inner diameter of the first segment. The engine bearer has at least one second fastening hole corresponding to the first fastening hole such that a fastener passes through the first and second fastening holes to fix the engine bearer to the housing. The crank is pivotally connected to the self-powering generator accommodated in the receiving space. The self-powering generator has all of the technical features of the foregoing self-powering generator.

Hence, the primary objective of the present invention is to provide a two-stroke gasoline engine equipped with a self-powering generator, wherein the pivotal connection between the crank of the two-stroke gasoline engine and the self-powering generator allows the self-powering generator to be driven to generate the power for operating electronic parts of the model device as the two-stroke gasoline engine operates.

Another objective of the present invention is to provide a two-stroke gasoline engine equipped with a self-powering generator, wherein the two-stroke gasoline engine is activated and sustained to drive the self-powering generator to generate a power to drive the electronic parts of the model device to operate, so that there is no need to use a power storage device such as a storage battery or battery.

Still another objective of the present invention is to provide a two-stroke gasoline engine equipped with a self-powering generator, wherein the housing is provided on a side of the two-stroke gasoline engine and has at least one first fastening hole engineered to meet industry standard specifications, and the engine bearer has at least one second fastening hole, corresponding to the first fastening holes, such that a fastener passes through the first and second fastening holes to fix the engine bearer to any housing of the industry standard specifications. Thus, the self-powering generator is not limited to work with a specially designed housing, thereby expanding its applicability.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

While the present invention discloses a two-stroke gasoline engine and a self-powering generator thereof, the principles on which the gasoline engine works and the principles on which the self-powering generator generates power have been known to persons of ordinary skill in the art and need not to be discussed in any length herewith. Also, the accompanying drawings referred by the following description are intended to show the characteristics of the present invention and are not made to scale.

Figure 1:
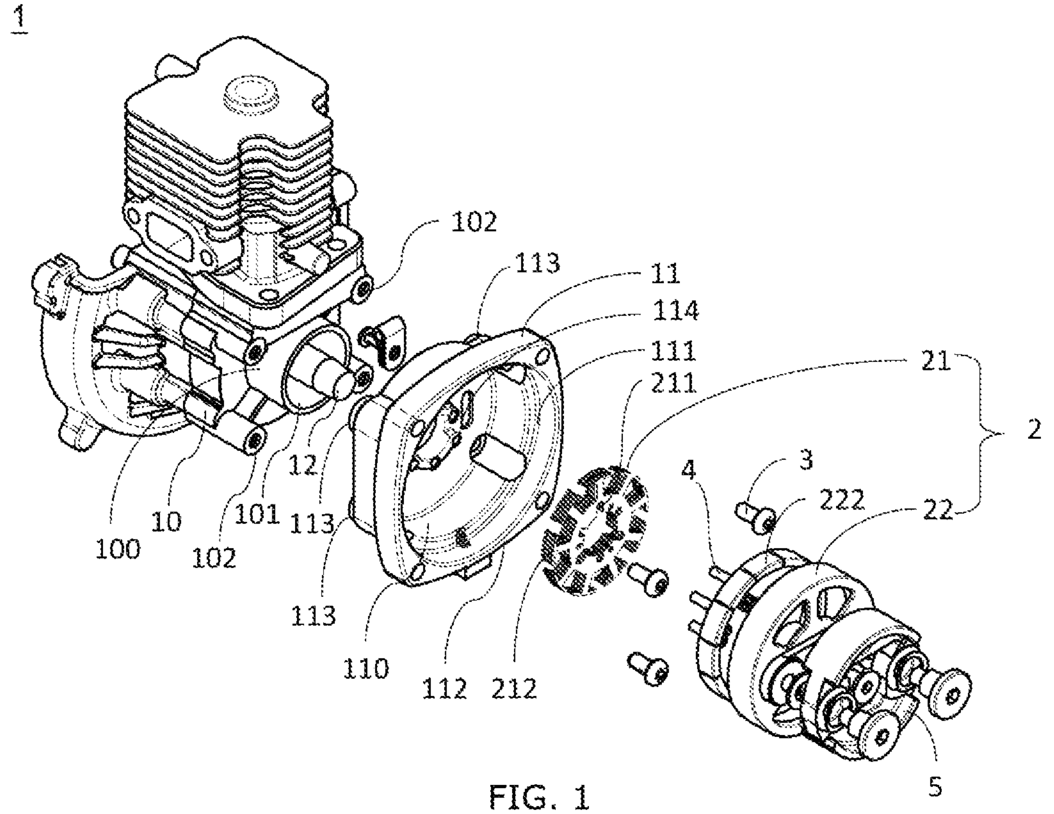
FIG. 1 is an exploded view of a two-stroke gasoline engine equipped with a self-powering generator according to the present invention.

Referring to FIG. 1, in a first embodiment of the present invention, a two-stroke gasoline engine 1 equipped with a self-powering generator 2 is shown in its exploded view. Therein, the two-stroke gasoline engine 1 further includes a housing 10, an engine bearer 11 and a crank 12. The housing 10 is provided on a side 100 of the two-stroke gasoline engine 1 and formed with a hollow central part 101. The housing 10 has at least one first fastening hole 102 and the engine bearer 11 has at least one second fastening hole 113, corresponding to the first fastening hole 102 such that a fastener 3 passes through the first and second fastening holes 102 and 113 to fix the engine bearer 11 to the housing 10. Additionally, the engine bearer 11 is formed on a side thereof with a concave receiving space 110 for accommodating the self-powering generator 2. The receiving space 110 is formed with a first segment 111 and a second segment 112. An inner diameter of the second segment 112 is larger than an inner diameter of the first segment 111. The crank 12 provided from the central part 101 to pass through the engine bearer 11 and with one end protruding into the receiving space 110. The self-powering generator 2 includes a stator 21 fixed to the engine bearer 11 and a rotor 22. The stator 21 further has at least one first positioning hole 211, and the engine bearer 11 has at least one second positioning hole 114 corresponding to the first positioning hole 211 such that a positioning bolt 4 passes through the first positioning holes 211 and 114 to fix the stator 21 to the engine bearer 11.

Figure 2:
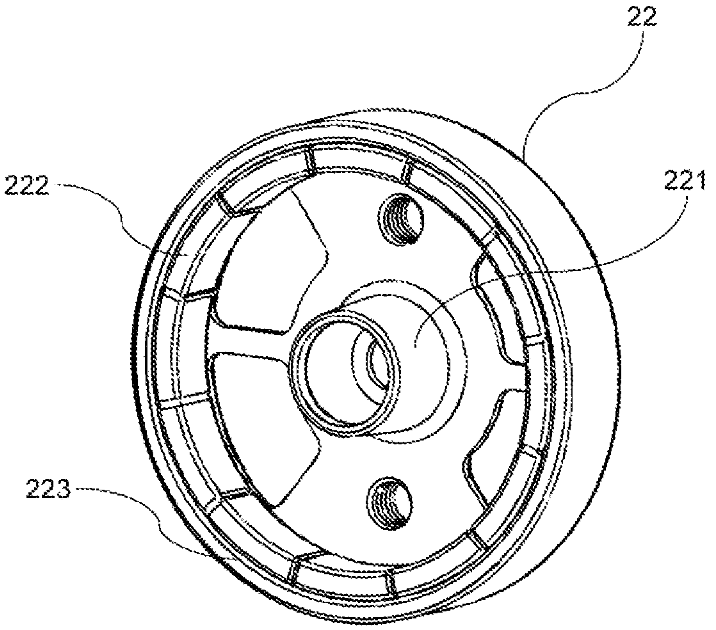
FIG. 2 is a schematic view of a rotor according to the present invention.

Referring to FIG. 2, the rotor 22 is provided with a central pivot part 221 and a plurality of permanent magnets 222. The permanent magnets 222 are disposed on an inner sidewall 223 of the rotor 22. Referring back to FIG. 1, the permanent magnets 222 of the rotor 22 circle the stator 21. The stator 21 has nine enamelled-wire wound pivots 212, and the rotor 22 has twelve permanent magnets 222, so as to form an inner-stator-and-outer-rotor structure. The rotor 22 is fixed to the crank 12 of the engine bearer 11 through the central pivot part 221 and an outer diameter of the rotor 22 is smaller than the inner diameter of the first segment 111. Preferably, the outer diameter of the rotor 22 approximates but is not equal to the inner diameter of the first segment 111, so as to fit the first segment 111 of the receiving space 110 better. In the present embodiment, the present invention may further have a clutch shoe 5 that is fixed to the rotor 22 for being driven by the rotor 22 to rotate together with the rotor 22 synchronously.

The present invention also provides a second embodiment of the present invention, a two-stroke gasoline engine, as shown in FIG. 1. The two-stroke gasoline engine includes a housing 10, an engine bearer 11, a crank 12 and a self-powering generator 2. The housing 10 is provided on a side 100 of the two-stroke gasoline engine 1 and formed with a hollow central part 101. The housing 10 has at least one first fastening hole 102 and the engine bearer 11 has at least one second fastening hole 113, corresponding to the first fastening holes 102, such that a fastener 3 passes through the first and second fastening holes 102 and 113 to fix the engine bearer 11 to the housing 10. Since the first fastening hole 102 of the housing 10 is engineered to meet industry standard specifications, the self-powering generator 2 can be fixed to any housing 10 of the industry standard specifications. Thus, the self-powering generator 2 is not limited to work with a specially designed housing 10, thereby expanding its applicability. Additionally, the engine bearer 11 is formed on a side thereof with a concave receiving space 110 for accommodating the self-powering generator 2. The receiving space 110 is formed with a first segment 111 and a second segment 112. An inner diameter of the second segment 112 is larger than an inner diameter of the first segment 111. The crank 12 provided from the central part 101 passes through the engine bearer 11 with the end protruding into the receiving space 110. The self-powering generator 2 of the present embodiment has all of the technical features of the self-powering generator 2 of the first embodiment and need not to be described again.

Figure 3:
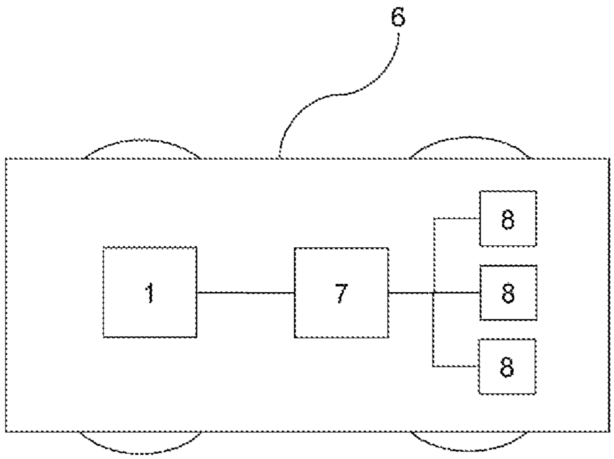
FIG. 3 is a schematic drawing showing the two-stroke gasoline engine equipped with a self-powering generator of the present invention applied to a radio-controlled model device.

Referring to FIG. 3, the two-stroke gasoline engine 1 of the present invention, as described in either the first embodiment or the second embodiment, can be installed in a radio-controlled model device 6 selected from the group consisting of a radio-controlled car, a radio-controlled boat, a radio-controlled airplane or the like. In fact, the radio-controlled model device 6 powered by the two-stroke gasoline engine 1 is a suitable device working with the two-stroke gasoline engine 1 of the present invention. Moreover, when the two-stroke gasoline engine 1 of the present invention is installed in the radio-controlled model device 6, the self-powering generator 2 may connect to an AC/DC rectifier 7, so that the AC power generated by the self-powering generator 2 can be converted into a DC power and undergoes a voltage stabilization process to be output. The power generated by self-powering generator 2 can drive a servo motor or/and an electronic parts 8 to operate.

As per the technical features disclosed in the present invention, the pivotal connection between the crank 12 of the two-stroke gasoline engine 1 and the self-powering generator 2 allows the self-powering generator 2 to be driven to generate the power as the two-stroke gasoline engine 1 operates. Thus, with the two-stroke gasoline engine 1 equipped with the self-powering generator 2 as disclosed by the present invention, a radio-controlled model device 6 can supply the electronic parts 8 uninterrupted power without using any power storage device such as a storage battery or a battery. Thereby, the shortcomings of the prior art can be effectively overcome.

The two-stroke gasoline engine 1 of the present invention, as described in the embodiments, normally has an idle speed of 3500 rpm~4000 rpm, and generates a voltage of 7 V~7.8 V. When the throttle of the model device is opened, the maximum speed is up to 18000 rpm~19000 rpm, and generates a voltage up to 40 V. The generated power undergoes a voltage stabilization process by the AC/DC rectifier 7 to be output at a voltage of 6 V, and steadily supply the radio-controlled model device 6 to drive the electronic parts 8 to operate.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A two-stroke gasoline engine equipped with a self-powering generator (2), the two-stroke gasoline engine (1) comprising:

- a housing (10) provided on a side (100) of the two-stroke gasoline engine (1) and formed with a central part (101);
- an engine bearer (11) fixed to the housing (10) and formed on a side thereof with a receiving space (110) for accommodating the self-powering generator (2), the receiving space (110) being formed with a first segment (111) and a second segment (112), an inner diameter of the second segment (112) being larger than an inner diameter of the first segment (111); and
- a crank (12) provided from the central part (101) to pass through the engine bearer (11) with one end protruding into the receiving space (110), wherein the self-powering generator (2) comprises:
  - a stator (21) fixed to the engine bearer (11); and
  - a rotor (22) provided with a central pivot part (221) and a plurality of permanent magnets (222), wherein the rotor (22) is fixed to the crank (12) through the central pivot part (221), and an outer diameter of the rotor (22) is smaller than an inner diameter of the first segment (111).

2. The two-stroke gasoline engine of claim 1, wherein the two-stroke gasoline engine (1) is installed in a radio-controlled model device (6) selected from the group consisting of a radio-controlled car, a radio-controlled boat, and a radio-controlled airplane.

3. The two-stroke gasoline engine of claim 1, wherein the housing (10) has at least one first fastening hole (102) and the engine bearer (11) has at least one second fastening hole (113) corresponding to the first fastening hole (102) such that a fastener (3) passes through the first and second fastening holes (102, 113) to fix the engine bearer (11) to the housing (10).

4. The two-stroke gasoline engine of claim 1, wherein the stator (21) has at least one first positioning hole (211), and the engine bearer (11) has at least one second positioning hole (114) corresponding to the first positioning hole (211) such that a positioning bolt (4) passes through the first and second positioning holes (211, 114) to fix the stator (21) to the engine bearer (11).

5. The two-stroke gasoline engine of claim 1, wherein the stator (21) has nine enamelled-wire wound pivots (212) and the rotor (22) has twelve permanent magnets (222).

6. The two-stroke gasoline engine of claim 1, wherein the permanent magnets (222) are disposed on an inner sidewall (223) of the rotor (22) so as to circle the stator (21) and form an inner-stator-and-outer-rotor structure.

7. The two-stroke gasoline engine of claim 1, further comprising a clutch shoe (5) fixed to the rotor (22) for being driven by the rotor (22) to rotate together with the rotor (22) synchronously.

8. A two-stroke gasoline engine configured to be installed in a radio-controlled model device (6) comprising:

- a housing (10) provided on a side (100) of the two-stroke gasoline engine (1) and formed with a central part (101) and at least one first fastening hole (102);
- an engine bearer (11) fixed to the housing (10) and formed on a side thereof with a receiving space (110), the receiving space (110) being formed with a first segment (111) and a second segment (112), an inner diameter of the second segment (112) being larger than an inner diameter of the first segment (111), wherein the engine bearer (11) has at least one second fastening hole (113) corresponding to the first fastening hole (102) such that a fastener (3) passes through the first and second fastening holes (102, 113) to fix the engine bearer (11) to the housing (10); and
- a crank (12) provided from the central part (101) to pass through the engine bearer (11) with one end protruding into the receiving space (110); and
- a self-powering generator (2) accommodated in the receiving space (110).

* * * * *